United States Patent [19]

Leonardo et al.

[11] 3,922,947
[45] Dec. 2, 1975

[54] DROP IN ANCHOR STUD

[75] Inventors: Ignazio Leonardo, Mountainside;
Eugene Coll, Cranford, both of N.J.

[73] Assignee: General Cable Corporation,
Greenwich, Conn.

[22] Filed: Mar. 12, 1974

[21] Appl. No.: 450,392

Related U.S. Application Data

[63] Continuation-in-part of Ser. No. 338,622, March 6, 1973, abandoned.

[52] U.S. Cl. ................................................. 85/77
[51] Int. Cl.² ......................................... F16B 13/06
[58] Field of Search ........................ 85/77–79, 85

[56] References Cited
UNITED STATES PATENTS

| 494,745 | 4/1893 | Phillips | 85/77 |
|---|---|---|---|
| 3,277,770 | 10/1966 | McCulloch | 85/77 |
| 3,352,193 | 11/1967 | Lerich | 85/79 |
| 3,448,651 | 6/1969 | Passer | 85/77 |
| 3,709,089 | 1/1973 | Seetaram | 85/77 |
| 3,750,526 | 8/1973 | Lerich | 85/85 |

FOREIGN PATENTS OR APPLICATIONS

| 897,594 | 5/1962 | United Kingdom | 85/85 |
|---|---|---|---|
| 1,089,586 | 11/1967 | United Kingdom | 85/85 |

*Primary Examiner*—Edward C. Allen

[57] ABSTRACT

The stud, pin or the like of this invention is used in a blind hole in masonry or similar material. It has a threaded upper end and some distance below the upper end the stud is necked down and garroted with a tapered, frusto conical portion below the neck for expanding a collar which surrounds the neck. The collar is a split ring which has to be compressed to fit into the hole, and upward pull on the stud causes the frusto conical portion to expand the stud and firmly secure it in the wall or other object in which the hole is located. The collar is shaped to prevent it from rotating in the hole.

6 Claims, 10 Drawing Figures

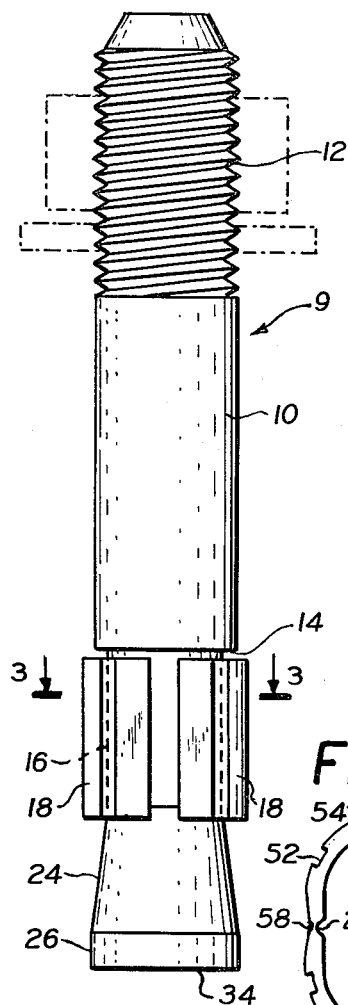
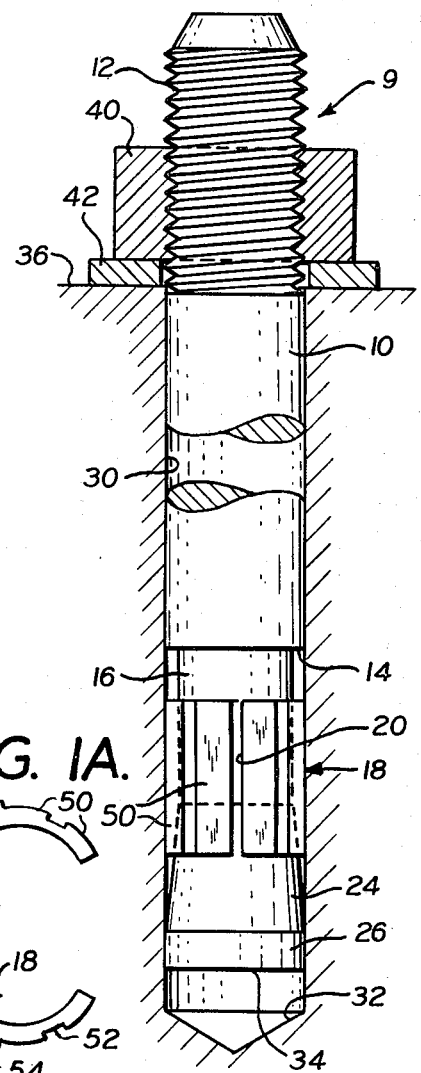
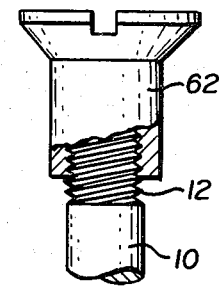
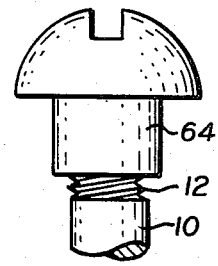
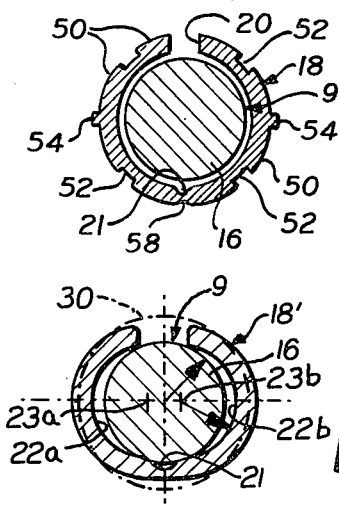
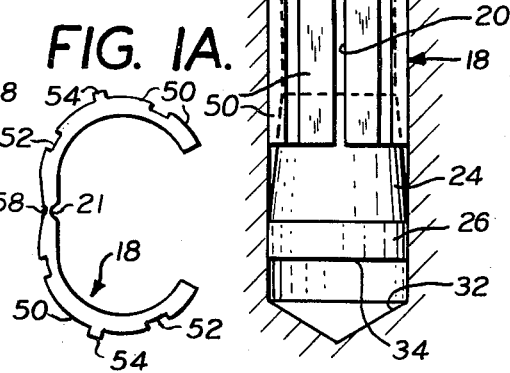
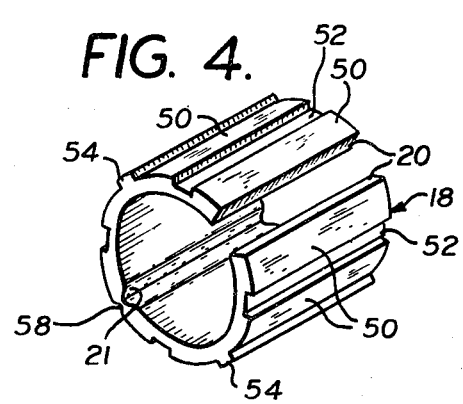
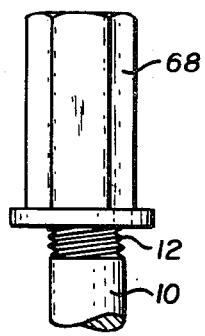

3,922,947

DROP IN ANCHOR STUD

RELATED PATENT APPLICATION

This application is a continuation-in-part of our application Ser. No. 338,622, filed Mar. 6, 1973 and now abandoned.

BACKGROUND AND SUMMARY OF THE INVENTION

This invention provides an improved anchor for securing a stud, pin or the like in a blind hole. One feature of the construction is that the anchor is a self contained unit with no loose parts which have to be handled separately from the anchor or assembled with it in the hole. The anchor has a collar which is split but made in one piece with a hinge like web which holds the collar in place on the anchor but which splits apart after being installed and subjected to torquing.

The anchor has longitudinal grooves on the outside surface of the collar which enables it to flex and expand more uniformly due to the reduced section on tightening of the stud for better circumferential contact and gripping power. These longitudinal grooves and the ridges that they form prevent rotation of the collar in the hole. The ridges dig into the masonry to compensate for variations in the sides of the hole and to improve the holding power.

Another feature of the invention is that the collar is split and originally fits around the stud with the radius of curvature of portions of the inside surface of the collar smaller than that of a confronting surface of the stud for contact of the collar with the stud at angularly spaced locations. In a modified construction, the radius of curvature of the collar is larger than a confronting surface of the stud. The collar is designed to "flex" when tapped into the hole (the collar will close up at the split) for immediate gripping to prevent the rotation and to compensate for variation in hole size. The ductile and resilient material used to make the collar also compensates for irregularities in the drilling of the hole so that the collar will compress and fill every void in the masonry.

Anchor can be temporarily installed by tapping in lightly without tightening the nut of the anchor and even though not expanded to secure the anchor in place, it will not drop out. This is especially helpful with ceiling installations.

The diameter of the main portion of the anchor stud is substantially the same as the diameter of the drilled hole in which the anchor is intended to be used. That is, a one-half inch diameter anchor is used in a one-half inch diameter hole with clearance for a "running fit." The collar, which is compressed in order to enter the hole, presses against the sides of the hole so as to always maintain friction, and when any axial force is applied to pull the anchor out of the hole, the tapered portion of the anchor expands the collar so that the frictional gripping force of the anchor against the sides of the hole is proportional to the axial force tending to pull the anchor out of the hole.

Other objects, features and advantages of the invention will appear or be pointed out as the description proceeds.

BRIEF DESCRIPTION OF DRAWING

In the drawing, forming a part hereof, in which like reference characters indicate corresponding parts in all the views;

FIG. 1 is an elevation of an anchor stud made in accordance with this invention;

FIG. 1A is a view showing the original shape of the collar;

FIG. 2 is a view similar to FIG. 1 but showing the anchor stud located in a hole and with the tapered portion of the stud moved upward with respect to the collar so as to force the collar into firm contact with the sides of the hole;

FIG. 3 is a sectional view taken on the line 3—3 of FIG. 1;

FIG. 3A is a view similar to FIG. 3 but showing a modified collar construction;

FIG. 4 is an isometric view of the collar closed unassembled; and

FIGS. 5–8 are elevations of different head elements which can be screwed over the upper end of the anchor stud in place of a conventional nut.

DESCRIPTION OF PREFERRED EMBODIMENT

The anchor stud 9 shown in FIG. 1 has a midportion 10 and a threaded upper end 12; the maximum diameter of the threads 12 being substantially equal to the diameter of the cylindrical midportion 10. The stud is necked down at a shoulder 14 and this reduced diameter portion below the shoulder 14 is shown in dotted lines in FIG. 1 and indicated by the reference character 16.

A collar 18 fits around the reduced diameter portion 16 and is at least as long as the portion 16. The collar 18 is made of metal which is ductile and resilient and which has a substantial amount of flexibility. The collar has a split 20 which permits the collar to change its diameter if pressed from the outside so as to force the sides of the split 20 close together or if pressure is applied to the sides of the split to increase the inside diameter of the collar 18.

The collar 18 is preferably manufactured by originally extruding a strip having the cross section shown in FIG. 1A. The collar 18 is formed by cutting a length of the extruded strip 17 and the extruded material is bent from the shape shown in FIG. 1A to a split ring that is the collar 18. The collar 18, shaped as in FIG. 1A can be formed into a split ring by bending it along a groove 21 that constitutes a hinge line. The collar 18 is bent around the portion 16 of the stud 9. The extruded material, of which the collar 18 is made has sufficient elasticity to spring open at the split 20, as shown in FIGS. 3 and 4, after being bent from the shape of FIG. 1A to a closed ring. With this split 20 open, the collar 18 has an inside diameter larger than the diameter of the reduced diameter portion 16 of the stud 9, as shown in FIG. 3. This normal diameter of the split ring that forms the collar 18 makes the outside diameter of the collar larger than the maximum diameter of the anchor stud, as shown in FIG. 1.

When the collar 18 is formed to the diameter shown in FIG. 3, the radius of curvature of the inside faces of the collar on both sides of the groove 21 are slightly greater than the radius of the minimum diameter portion 16 of the stud. The lower end of the collar 18 rests on the frusto conical portion 24 at the location where the radius of curvature of the frusto conical portion 24 is equal to the radius of curvature of the inside faces of the collar 18, shown in FIG. 3.

When the collar 18 is bent to a smaller overall cross-section, as when being inserted into a hole in masonry, the collar bends along the groove or hinge line 21 and the inside faces of the opposite halves of the collar come into contact with the small diameter portion 16. This, of course, requires that the collar 18 rise to a level even with the top of the frusto conical portion 24 shown in FIG. 1.

FIG. 3A shows a collar 18' which is shaped somewhat differently than the collar 18. Corresponding parts of the collar 18' are indicated by the same reference character as in FIGS. 1–3 but with a prime appended. The collar 18' has a groove 21' forming a hinge line as in the case of the collar 18. There is a difference, however, in the radius of curvature of the inside faces of the collar 18' as compared with the collar 18. For example there are inside faces 22a and 22b which have a radius of curvature which is preferably less than the radius of the minimum diameter portion 16 of the stud 9. The center of curvature for each of the faces 22a and 22b is indicated by the reference character 23a and 23b respectively.

As the result of this correlation, the curvatures cause the collar 18 to contact with the confronting face of the portion 16 of the stud, as shown in FIG. 3A. Thus the construction presented is a collar 18' which is generally oval in cross-section and in contact at spaced locations around a circular reduced diameter portion 16 of the stud.

FIG. 3A shows the hole in the masonry by broken lines 30. It will be evident that the oval contour of the ring or collar 18' must be compressed in one direction in order to fit within the hole in the masonry. This provides an interference fit between the anchor and the hole into which the anchor is to be installed, thus providing a flexible anti-rotational feature allowing for variations in the hole sizes that are prevalent in actual use. As the nut on the anchor is tightened, the collar 18' forms itself around the tapered portion of the stud 9 to give a full and complete circumferential expansion which increases the holding power. The differences that exist in radii between the collar 18' and the reduced diameter portions 16 of the stud 9 make and provide an effortless installation in that the collar body dimension is flexible and will flow depending upon the hole configuration.

Below the reduced diameter portion 16, the anchor stud has a frusto conical lower portion 24 which tapers from a minimum diameter substantially equal to the diameter of the portion 16 to a maximum diameter equal to that of the midportion 10. Beyond the maximum diameter of the frusto conical portion 24 there is preferably a short length 26 of the anchor stud which is cylindrical and of a diameter equal to that of the midportion 10.

The anchor stud is intended to be used in a hole having a diameter equal to that of the midportion 10 and the short length 26 at the bottom of the anchor. These parts of the anchor are of the diameter of the hole in which the anchor stud is intended to be used.

FIG. 3 shows the anchor stud of FIG. 1 located in a hole 30 which has a bottom 32. A bottom face 34 of the anchor stud strikes against the bottom 32 of the hole if the hole is of minimum depth for the anchor stud. When the stud is being inserted into the hole 30, the collar 16 is compressed to the diameter of the hole 30 and then the anchor stud is forced into the hole, preferably by tapping, with the collar 16 maintaining a friction contact with the sides of the hole so that the anchor stud will stop and remain stationery at any location to which it is moved.

If the hole 30 is longer than necessary, then the anchor stud is only inserted for a distance substantially equal to, or slightly less than the final position at which it is desired to have the anchor stud occupy when the anchor stud is secured in place. As shown in FIG. 2, the midportion 10 and the short length 26 of the anchor stud have the same diameter as the opening 30, or substantially the same diameter so that the anchor stud is a snug fit in the hole 30. The collar 16 is compressed so that the sides of the split of the collar are moved close enough together to make the collar 16 have the same diameter as the hole 30.

In order to secure the anchor stud in place in a wall 36 into which the hole 30 has been drilled, an axial force is applied to the threaded upper end 12 in a direction tending to pull the anchor stud out of the hole 30. This force can be applied by screwing a nut 40 over the threaded upper end 12; and FIG. 3 shows such a nut 40 pressing downward against a washer 42 that contacts with the wall 36.

Because of the resilient spring action of the collar 16, which tends to increase in diameter to its original diameter shown in FIGS. 1, 3 & 3A, the collar 16 presses against the sides of the hole 30 with substantial force. Thus the collar 16 resists any force applied to it to move it axially in an upward direction in FIG. 2. Upward movement of the frusto conical lower portion 24 of the anchor stud causes the taper of the frusto conical portion to expand the lower end of the collar 16 and force it into contact with the sides of the opening 30 with increased force, thereby greatly increasing the friction with which the collar 16 resists any upward movement in the opening 30. The harder the anchor stud is urged upward by screwing down the nut 40, the greater the radial force exerted by the frusto conical portion 24 against the collar 16, and the greater the friction of the collar 16 against the sides of the hole 30.

The taper of the frusto conical portion 24 is between 3° and 20° and preferably between 3° and 10°, the angle of taper being the angle between the sloping face of the frusto conical portion and the axis of the anchor stud measured on a plane cutting through a diameter of the anchor stud. With this low angle of taper, the friction grip of the collar 16 on the sides of the hole 30 increases faster than the force tending to pull the anchor stud out of the hole. Thus the nut 40 becomes tight; and if a bracket is substituted for the washer 42, this bracket is firmly secured to the wall 36 or other structure in which the hole 30 has been drilled.

In order to have the frusto conical portion 24 force the collar 16 against the sides of the hole 30 with substantial gripping force, it is necessary that there be some relative movement of the frusto conical portion 24 with respect to the collar 16 in an upward direction. This movement will be apparent by comparing FIGS. 1 and 2; the latter showing the frusto conical portion 24 pulled into the collar 16 for a distance equal to between one quarter and one third of the height of the collar 16. This displacement is somewhat exaggerated as compared to that encountered in most constructions, but the actual relative displacement of the frusto conical portion 24 with respect to the collar 16 depends upon the accuracy of the diameter of the hole 30 and upon the hardness of the material from which the collar 16 is made, and upon other variables which require that the anchor stud structure have a reasonable range of manufacturing tolerances.

In order to give the collar 18 better gripping power and to increase its ability to resist rotation, the collar 18 is made with axially extending ridges 54. In the collar construction illustrated in FIGS. 1–3, there are two ridges 54 extending upward from the circumference 50 of the collar. There are grooves 52 where the collar is of reduced radial thickness; and metal at the bottoms of these grooves 52 stretches as the collar expands. The collar 18' (FIG. 3A) may have the same outside contour as the collar 18, if desired.

The threaded upper end 12, midportion 10, reduced diameter portion 16, frusto conical portion 24 and the short length 26 at the lower end of the anchor stud are preferably made of one piece of steel, or other metal, cast or machined to obtain the correlation shown in the drawing, or equivalent correlations. The collar 18 is also made in one piece. In the preferred construction, most of this flexibility is attained by having a web 58 of reduced thickness under the groove 21 of the hinge line which extends axially along the collar and which is substantially opposite the split 20. The web 58 is made thin enough so that when a substantial force is applied to the collar 18 by the frusto conical portion 24, the collar will rupture along the hinge line. When the collar is formed from the shape shown in FIG. 1A to the shape shown in FIGS. 3 and 4, a nick or tear in the surface of the outside circumference of the collar generally occurs along the hinge line 21. This nick or tear facilitates the breaking of the collar at the hinge line when the collar is expanded in the operation of the anchor. Having the collar 18 break into two substantially semi-cylindrical portions along the web 58 facilitates expansion of the collar in opposite directions against the wall 30 on opposite sides of the frusto conical portion 24.

FIGS. 5–8 show different fittings which can be used at the upper end of the anchor stud in place of the nut 40 which is shown in FIG. 2. Depending upon the use to which the anchor stud is used, different things are more desirable for the threaded end of the anchor stud. For example, if a panel is being secured to the wall in which the anchor stud is secured, it may be desirable to use a fitting 62, such as shown in FIG. 5, so that the panel will appear to be attached to the wall by countersunk screws. Such an effect may be much more decorative than the use of nuts. For some purposes round-headed screws may be more desirable for effect and a special fitting 64, shown in FIG. 6 is screwed over the threaded upper end 12 of the anchor stud.

If the anchor stud is used in a ceiling or beam from which wires or rods, as for dropped ceilings, are to be supported from the anchor stud, then a wire hanger 66, as shown in FIG. 7 can be used; or a rod hanger 68, such as shown in FIG. 8.

The preferred embodiment of the invention has been illustrated and described, but changes and modifications can be made and some features can be used in different combinations without departing from the invention as defined in the claims.

What is claimed is:

1. An anchor stud assembly including in combination a stud comprising a mid-portion, a threaded upper end above the mid-portion, a lower portion that has a maximum diameter substantially equal to the diameter of the mid-portion and that has a frusto conical surface that tapers to a smaller diameter towards said mid-portion, a reduced diameter portion between the mid-portion and said frusto conical surface, a unitary collar of malleable metal extrudant extending circumferentially around the reduced diameter portion, a shoulder at the juncture of the mid-portion and the reduced diameter portion for holding the collar on the stud and for transmitting force to the collar when the stud is being tapped into a hole, the collar having a length as great as most of the length of the reduced diameter portion, and the collar having its outside surface formed with a plurality of longitudinally-extending ridges and grooves, all of which extend for the full length of the collar and each of which is of uniform cross-section for its full length, the portions of the collar at the bottoms of the grooves being thinner, in a radial direction, than the portions of the collar adjacent to the sides of the grooves and the grooves including one groove where the collar is thinner than at the other grooves and along which the collar breaks into two generally semi circular pieces as the collar is expanded by upward movement of the frusto conical portion with respect to the collar, and the thin portions at the bottoms of the other grooves providing areas of circumferential extent at which the malleable metal of the collar stretches as the collar is expanded by the frusto conical surface to increase the pressure of the collar against the side of a hole into which the stud is inserted.

2. The anchor stud assembly described in claim 1 characterized by the collar being of one piece construction and split so that its diameter can be changed by moving the edges of the split toward and from one another, the collar having longitudinally extending shoulders angularly spaced around the circumference of the collar and at which the thickness of the collar changes, the malleable metal of the collar having an unflexed diameter larger than the diameter of the stud and larger than the diameter of the hole in which the stud assembly is intended to be used, said collar being compressible to a smaller diameter which fits the hole into which the anchor stud assembly is inserted but the collar having sufficient resilience to expand and to bring longitudinally extending surfaces thereof into contact with the sides of the hole after the collar has been compressed so as to insert the anchor stud into the hole whereby the anchor stud has to be moved into the hole by force, such as transmitting force, to the top of the collar through said shoulder at the juncture of the mid-portion and the reduced diameter portion of the stud, by tapping the upper end of the stud to overcome the friction of said longitudinally extending surfaces against the sides of the hole.

3. The anchor stud assembly described in claim 1 characterized by the collar being a split ring with the thinner groove constituting a hinge portion of one piece construction with the rest of the collar and extending for the full longitudinal length of the collar, the collar being split on the side away from the hinge portion.

4. The anchor stud assembly described in claim 1 characterized by the collar having an original shape with generally semi-circular arc portions confronting one another on opposite sides of said thinner groove, said thinner groove comprising a hinge groove which is at a circumferential mid-portion between said arc portions, a part of the hinge groove constituting a section at which the collar can be bent to bring the arc portions closer together, the centers of curvature of the arc portions being originally spaced from one another, whereby the semi-circular arc portions are excentric with respect to the stud and with respect to one another, said centers of curvature being brought closer together as the collar is bent to bring the arc portions closer together for insertion of the collar into an opening in which the anchor stud is to be used, the material of the collar having sufficient resilience to spring outward into contact with the sides of the opening after being bent sufficiently to be inserted into the stud opening.

5. The anchor stud described in claim 4 characterized by the frusto conical portion of the stud having a part of its length with a radius of curvature greater than that of the original arc portions of the collar, and the collar being of material that bends to form itself around the tapered frusto conical portion of the stud as the stud is tightened in the opening in which it is used.

6. The anchor stud assembly described in claim 1 characterized by the collar being split at one side and having curved portions on both sides of the split and joined to one another on the side of the collar opposite the split, the inside faces of said curved portions being arcs of substantially uniform curvature throughout their axial length but having radii of curvature less than that of the confronting surface of the reduced diameter portion of the stud that confronts the collar when the stud is to be inserted in a hole, the curvature relationship giving the collar a generally oval shape surrounding a circular midportion for compression of the collar in the direction of its greatest extent when the stud is to be inserted into a hole.

* * * * *